US006634675B2

(12) United States Patent  (10) Patent No.: US 6,634,675 B2
Parkes  (45) Date of Patent: Oct. 21, 2003

(54) PIPE LINER

(75) Inventor: Adrian Sydney Parkes, South Wonton (GB)

(73) Assignee: Transco PLC, London (GB)

( * ) Notice: Subject to any disclaimer, the term of this patent is extended or adjusted under 35 U.S.C. 154(b) by 30 days.

(21) Appl. No.: 09/147,406
(22) PCT Filed: Jun. 19, 1997
(86) PCT No.: PCT/GB97/01642
§ 371 (c)(1),
(2), (4) Date: Feb. 18, 1999
(87) PCT Pub. No.: WO97/49946
PCT Pub. Date: Dec. 31, 1997

(65) Prior Publication Data
US 2001/0045744 A1 Nov. 29, 2001

(30) Foreign Application Priority Data
Jun. 21, 1996 (GB) .............................. 9613009

(51) Int. Cl.[7] ................................ F16L 9/14
(52) U.S. Cl. .............................. 285/55; 285/3; 138/97; 138/89
(58) Field of Search ..................... 285/55, 3, 4; 138/89, 138/97, 98

(56) References Cited

U.S. PATENT DOCUMENTS

| 4,293,138 A | * | 10/1981 | Swantee ................. 285/231 X |
| 4,355,664 A | * | 10/1982 | Cook et al. ............... 138/98 X |
| 4,549,717 A | * | 10/1985 | Dewaegheneire ......... 138/89 X |
| 4,865,357 A | * | 9/1989 | Brinegar ....................... 285/55 |
| 5,060,696 A | * | 10/1991 | Putter .......................... 138/98 |
| 5,482,076 A | * | 1/1996 | Taylor et al. ............. 138/97 X |
| 5,497,807 A | * | 3/1996 | Rogers ......................... 138/98 |
| 5,507,501 A | * | 4/1996 | Palmer ..................... 138/89 X |
| 5,538,294 A | * | 7/1996 | Thomas ....................... 285/55 |
| 5,590,914 A | * | 1/1997 | Platner et al. ............ 285/55 X |
| 5,779,276 A | * | 7/1998 | Allen ........................... 285/55 |
| 5,782,498 A | * | 7/1998 | Vick et al. ................ 285/55 X |
| 5,868,169 A | * | 2/1999 | Catallo ........................ 138/98 |
| 5,868,437 A | * | 2/1999 | Teague .................... 285/55 X |
| 5,904,378 A | * | 5/1999 | Bakker et al. .............. 285/55 |
| 5,954,371 A | * | 9/1999 | Koke et al. .................. 285/55 |
| 6,056,016 A | * | 5/2000 | Rogers ......................... 138/98 |
| 6,102,624 A | * | 8/2000 | Delaforce ................. 138/98 X |
| 6,171,435 B1 | * | 1/2001 | Stoves et al. ............ 138/97 X |
| 6,343,412 B1 | * | 2/2002 | Stephenson ............... 138/98 X |

FOREIGN PATENT DOCUMENTS

| CA | 925905 | * 5/1973 | .................. 285/55 |
| EP | 0 606 483 | 7/1994 | |
| WO | WO 93/18565 | 9/1993 | |

* cited by examiner

Primary Examiner—Suzanne Dino Barrett
(74) Attorney, Agent, or Firm—Oblon, Spivak, McClelland, Maier & Neustadt, P.C.

(57) ABSTRACT

A pipe liner for lining an existing pipe. The pipe liner includes a first elongated portion of plastic material and a second portion extending from the elongated portion with a flexibility which is greater than the elongated portion. The additional flexibility assist the liner in its insertion through an existing pipe.

7 Claims, 1 Drawing Sheet

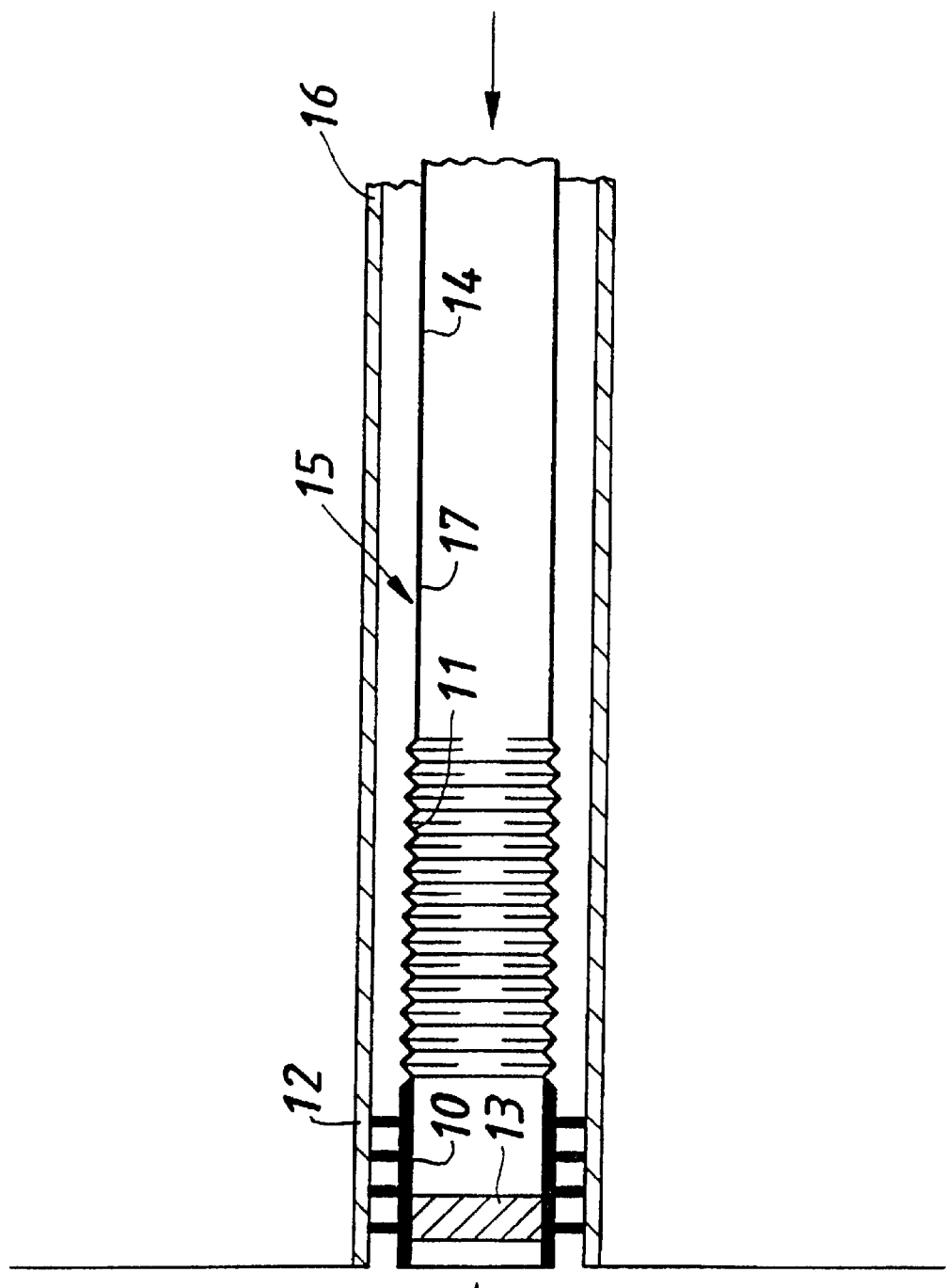

PIPE LINER

BACKGROUND OF THE INVENTION

The invention relates to a pipe liner configuration.

DISCUSSION OF THE BACKGROUND

In pipeline refurbishing (e.g. gas pipes) it is known to run a plastic liner pipe through an existing steel pipe. However there can be problems with insertion due to bends and other partial obstructions to the passage of the liner pipe.

SUMMARY OF THE INVENTION

According to the invention there is provided a liner pipe for lining an existing pipe comprising a first elongate portion of plastics material and including a second portion extending from the first portion and having a flexibility substantially greater than the first portion to assist in insertion through an existing pipe.

The second portion is preferably of corrugated construction.

The second portion preferably terminates in nose-cone configured to enable a seal to be formed between the liner pipe and the existing pipe and provided with stopper means temporarily to prevent fluid flow into the liner pipe.

DETAILED DESCRIPTION OF THE PREFERRED EMBODIMENTS

The invention will be described with reference to the accompanying drawing.

In the FIGURE a nose-cone 10, is welded onto corrugated pipe portion 11. The nose-cone 10, is of flexible plastic material e.g. polyethylene. The radial vanes 12, form a seal between the two pipes 15 and 16, as the liner pipe is pushed down the service pipe 16, to be lined. A stopper 13, of plastic (e.g. in disc form) is inserted into the nose-cone 10, to prevent gas entering liner pipe 15, while it is being pushed along the pipe 16 to be lined.

The corrugated leading section 11, of the pipe 15, is welded to an elongated portion 14, which is of a more rigid polyethylene construction which forms the major length of the inserted pipe 15.

When the liner pipe 15 is in position a rod (not shown) is inserted down the bore of the liner pipe 15 from the right-hand side to push the stopper 13, out and let gas enter the liner pipe 15.

What is claimed is:

1. A liner pipe for lining an existing pipe comprising a first elongate portion of plastics material and including a second portion connected to and extending from the first portion and having a flexibility substantially greater than the first portion to assist in insertion through an existing pipe, the second portion terminating in a nosecone configured to enable a seal to be formed between the liner pipe and the existing pipe and provided with a stopper temporarily to prevent fluid flow into the liner pipe, the liner pipe being configured such that pushing the first portion of the liner pipe into the existing pipe facilitates further insertion of the second portion into the existing pipe.

2. A liner pipe as claimed in claim 1 wherein the second portion is of corrugated construction.

3. A liner pipe as claimed in claim 1 wherein the seal includes radial vanes.

4. A liner pipe as claimed in claim 1 wherein means are insertable to co-operate with the stopper to move the stopper to allow fluid flow to restart.

5. A liner pipe as claimed in claim 3 wherein means are insertable to co-operate with the stopper to move the stopper to allow fluid flow to restart.

6. A liner pipe as claimed in claim 2 wherein the seal includes radial vanes.

7. A liner pipe as claimed in claim 2 wherein means are insertable to co-operate with the stopper to move the stopper to allow fluid flow to restart.

* * * * *